US008096408B2

(12) United States Patent
Deyanov et al.

(10) Patent No.: US 8,096,408 B2
(45) Date of Patent: Jan. 17, 2012

(54) SEGMENTED MATERIAL CONVEYOR SYSTEM, THRESHOLD ASSEMBLY AND METHOD FOR MAKING AND USING THE SAME

(75) Inventors: Roumen Deyanov, Fremont, CA (US); Joseph John Fatula, Jr., San Jose, CA (US)

(73) Assignee: Muratec Automation Co., Ltd., Kyoto (JP)

( * ) Notice: Subject to any disclaimer, the term of this patent is extended or adjusted under 35 U.S.C. 154(b) by 92 days.

(21) Appl. No.: 12/420,053

(22) Filed: Apr. 7, 2009

(65) Prior Publication Data
US 2010/0314224 A1 Dec. 16, 2010

Related U.S. Application Data

(60) Provisional application No. 61/043,092, filed on Apr. 7, 2008.

(51) Int. Cl.
*B65G 39/10* (2006.01)
(52) U.S. Cl. ........... 198/803.14; 198/803.15; 198/345.3; 29/759; 29/760
(58) Field of Classification Search ............... 198/345.1, 198/345.2, 345.3, 803.14, 803.15, 867.11, 198/867.12; 414/226.04; 29/759, 760
See application file for complete search history.

(56) References Cited

U.S. PATENT DOCUMENTS

| | | | | |
|---|---|---|---|---|
| 4,561,819 A * | 12/1985 | Wiernicki | ............... | 414/331.17 |
| 4,850,104 A * | 7/1989 | Matrone et al. | ................. | 29/829 |
| 4,898,268 A * | 2/1990 | Kamioka et al. | ........... | 198/345.1 |
| 5,240,104 A * | 8/1993 | Douglas | ........................ | 198/817 |
| 6,062,799 A * | 5/2000 | Han et al. | ................. | 414/416.07 |
| 6,223,886 B1 | 5/2001 | Bonora et al. | | |
| 6,336,548 B1 * | 1/2002 | Asai et al. | .................. | 198/468.4 |
| 6,425,178 B1 * | 7/2002 | Lee et al. | ........................ | 29/759 |
| 6,526,651 B1 * | 3/2003 | Hwang | .......................... | 29/740 |
| 6,663,712 B2 * | 12/2003 | Doyle et al. | .................. | 118/301 |
| 6,802,411 B2 * | 10/2004 | Murray et al. | ............. | 198/345.3 |
| 7,032,304 B2 * | 4/2006 | Gieskes | ......................... | 29/832 |
| 7,137,309 B2 * | 11/2006 | Weiss et al. | ................... | 73/865.8 |
| 7,200,922 B2 * | 4/2007 | Kabeshita et al. | ............. | 29/740 |
| 7,516,539 B2 * | 4/2009 | Hsia | .............................. | 29/740 |
| 7,784,606 B2 * | 8/2010 | Bonora et al. | ................ | 198/817 |
| 7,836,582 B2 * | 11/2010 | Gieskes et al. | ................. | 29/739 |

* cited by examiner

*Primary Examiner* — Douglas Hess
(74) *Attorney, Agent, or Firm* — Fish & Richardson P.C.

(57) ABSTRACT

A conveyor system is provided. The conveyor system includes a threshold assembly. The threshold assembly has a base plate that is secured to a floor, and the threshold assembly has a channel that is formed between two support beams that are secured to a base plate. A plurality of threshold center plates are provided, which span and enclose the channel formed by the support beams, such that each threshold assembly includes a modular printed circuit board that fits within the channel and is enclosed within the channel by threshold center plates. And, multiple conveyor segments are mountable to the threshold assembly. Other systems components and methods for making and operating the same are provided.

20 Claims, 15 Drawing Sheets

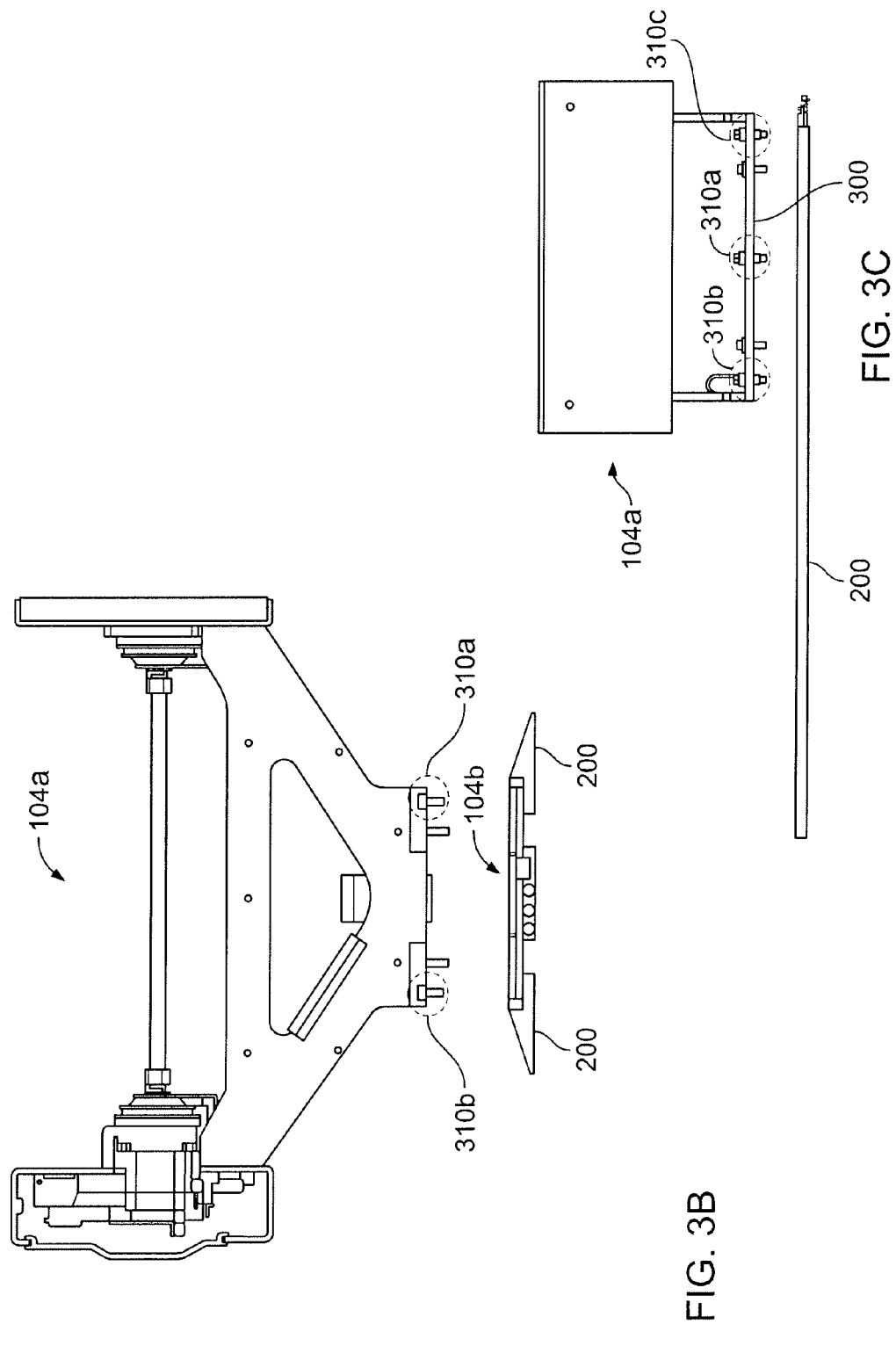

SEGMENTED MATERIAL CONVEYOR SYSTEM, THRESHOLD ASSEMBLY AND METHOD FOR MAKING AND USING THE SAME

CLAIM OF PRIORITY

The present application claims priority under 35 U.S.C. §119(e) from U.S. Provisional Patent Application No. 61/043,092, filed Apr. 7, 2008, which is incorporated by reference in its entirety for all purposes.

BACKGROUND OF THE INVENTION

Description of the Related Art

There are several ways that semiconductor wafer containers are transported in a semiconductor fabrication facility ("fab"). A system for transporting a container is often referred to as an Automated Material Transport System ("AMHS") or simply as a material transport system. A material transport system may refer to a part or all of the overall system. A fab may use only one type of AMHS throughout the fab, or there may be different types of AMHS in certain areas, or different types of AMHS for different transportation functions. Some of these AMHS types use vehicles to hold the container as it is being transported, such as a rail guided vehicle (RGV) or an automated guided vehicle (AGV). Material transport systems utilizing RGVs or AGVs require managing empty vehicles to arrange their arrival at sites where containers are to be picked up. Waiting for the arrival of such vehicles causes AMHS delays and the management of the vehicle movement increases the complexity of the AMHS. The same issues exist when moving containers with an Overhead Hoist Transport (OHT) system.

Conveyor systems are more efficient at moving containers within a fab without any, or a minimum number of, vehicle delays, and do not have to manage empty vehicles. Conveyors directly move the containers without any material or mechanical interface that comes between the conveyor surfaces and the container surfaces. Unless the conveyor is full, it is capable of immediately receiving a container for transport. For these, and other, reasons, conveyors may provide a very high throughput AMHS.

One example of a conveyor system is disclosed in U.S. Pat. No. 6,223,886, entitled "Integrated Roller Transport Pod and Asynchronous Conveyor," which is owned by Asyst Technologies, Inc., and is incorporated in its entirety herein. The drive rail 12 includes a drive system, generally designated at 38 in FIG. 1A, for propelling a container 2 along the rails 12. The drive system 38 includes a plurality of separate drive assemblies 40. Each drive assembly 40 includes a plurality of drive wheels 42 which frictionally engage the underside of the container 2 to propel the container 2 along the drive rail 12 for a specific zone Z. As shown in FIG. 1A, the drive assemblies 40 are located along the rail such that the separation between the outermost drive wheels 42 of adjacent drive assemblies 40 is substantially equal to the spacing between the drive wheels 42 of the individual drive assembly 40. The drive wheels 42 project upwardly from the drive rail housing such that it is the drive wheels 42 of the rail 12 which directly support the transport container 2. The wheels 42 are preferably mounted at approximately the same height to minimize tipping or rocking of the container 2 as it is moved along the rails 12. It is also known within the art to individually mount a passive wheel 43 between each drive wheel 42 (as shown in FIG. 1A).

It would be advantageous to provide a conveyor system that improves the performance of a conventional conveyor and reduces the costs of AMHS conveyor systems. The present invention provides such a conveyor.

In view of the forgoing, there is a need for improved modularity in order to reduce downtime and improve serviceability.

SUMMARY

A conveyor system made up from multiple modular conveyor segments is disclosed. The conveyor system can be viewed as a threshold assembly and individual conveyor segments. The threshold assembly can include a base plate that is secured to a floor. Also included in the threshold assembly is a channel that is formed between two support beams secured to the base plate. Spanning and enclosing the channel formed by the support beams are numerous threshold center plates. In one embodiment, the threshold assembly also includes a modular printed circuit board that fits within the channel and is enclosed within the channel by a threshold center plate. In some embodiments, it is possible for the modular printed circuit board to be mounted to the threshold center plate.

The individual conveyor segments can include drive motors, belts and sensors mounted to space frames and a kinematic plate. The kinematic plate enables the entire conveyor segment to be aligned and leveled before being secured to the threshold assembly. Features on the threshold center plate receive kinematic pins passed through the kinematic plate. The kinematic pins provide three-axis of adjustment of individual conveyor segment to ensure proper alignment and leveling irrespective of the conditions of the floor. Once aligned, the kinematic pins can be locked into position so the conveyor segment can be removed and replaced in a repeatable position. For example, when the conveyor segment is removed for maintenance or service and returned, the locked kinematic pins will place the conveyor segment in the same position so additional or repeated alignment is not necessary.

In one embodiment, the conveyors can be used in a semiconductor fabrication environment transporting Front Opening Unified Pods (FOUPs) between various fabrication tools. To minimize downtime, perform routine maintenance, or provide manufacturing flexibility, the fabrication tools may need to be moved. As the conveyors are anchored to the floor, individual conveyor assemblies can be removed from the threshold assembly to facilitate movement of fabrication tools. To further facilitate the movement of fabrication tools the profile of the threshold assembly can be minimized to allow wheeled equipment to be easily rolled over the threshold assembly. In one embodiment, the threshold assembly profile is reduced by using angled support beams that taper to a thinner cross-section at the interface between the base plate and the support beams.

BRIEF DESCRIPTION OF THE DRAWINGS

The invention, together with further advantages thereof, may best be understood by reference to the following description taken in conjunction with the accompanying drawings.

FIGS. 3A-3C are different views of support beams, a conveyor assembly and a mounting assembly.

DETAILED DESCRIPTION

An invention is disclosed for securing a conveyor system in a repeatable manner to enable rapid servicing and maintenance. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1A:
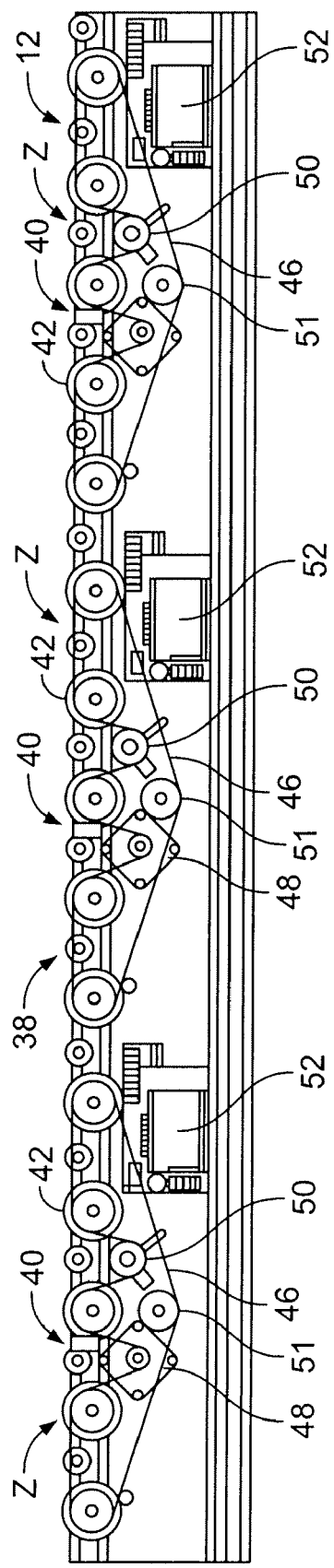
FIG. 1A provides a side elevation view of a conveyor, according to the prior art.
Figure 1B:
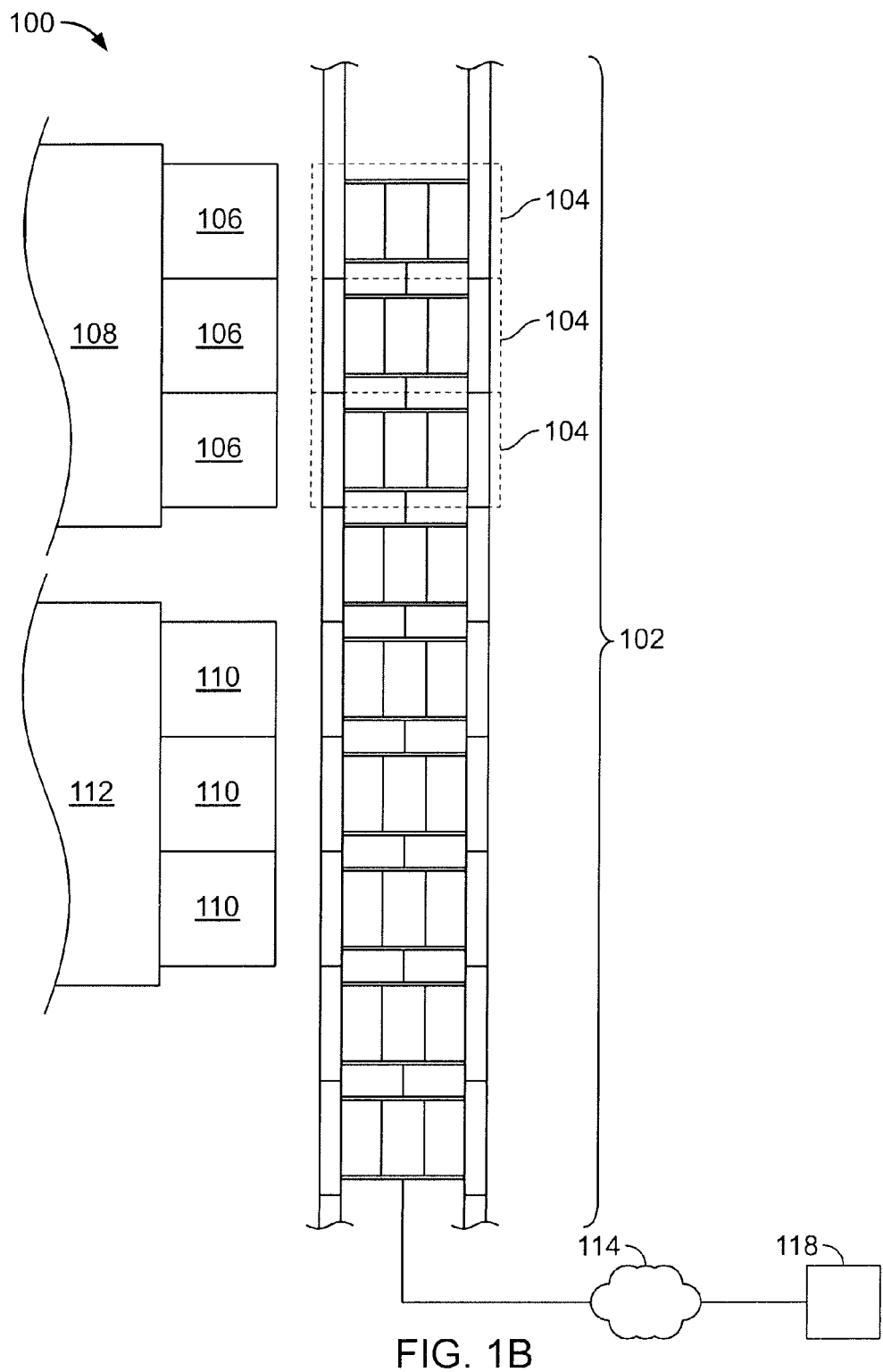
FIG. 1B illustrates a conveyor made up of multiple conveyor segments. The individual conveyor segments can include controllers that can be networked and controlled by a computer. The conveyor can be configured to transport Front Opening Unifed Pods (FOUPs) to tools via load ports.

FIG. 1B shows an exemplary overhead view of a processing area 100 in accordance with one embodiment of the present invention. The processing area 100 can include a conveyor 102 that is made up of multiple conveyor segments 104. The conveyor 102 can be configured to transport materials to and from tool 112 and tool 108. In one embodiment, semi-conductor substrates are transported along the conveyor 102 in Front Opening Unified Pods (FOUPs) (not shown). A FOUP traveling along the conveyor 102 can be loaded into load port 106 or load port 110 and the semi-conductor substrates can be processed within tool 108 or tool 112 respectively.

In one embodiment, the tool 108 and the tool 112 can be machines used in the processing of semiconductor substrates. Tool 108 and tool 112 may be the same tool or entirely different tools that perform similar or different functions. The embodiment illustrated in FIG. 1B shows each tool 108/112 having three load ports 106/110. This is merely illustrative of one embodiment and in other embodiments, more or fewer load ports could be associated with each respective tool.

In one embodiment, the conveyor segments 104 are modular assemblies that permit rapid service and maintenance of the conveyor 102. To facilitate rapid service and maintenance, each conveyor segment 104 can include belt modules, or belt cartridges that can be rapidly removed and replaced in order to minimize downtime for the conveyor 102. Each conveyor segment 104 can also include a motor to drive the belt modules along with a computer controller to activate and deactivate the motor. In one embodiment, the computer controllers for the conveyor segments 104 can be networked using a bus system to provide power and communications between the individual conveyor segments. Communications to the conveyer 102 can be performed using a network 114 that allows a computer 118 to monitor and control individual conveyor segments 104.

Figure 2:
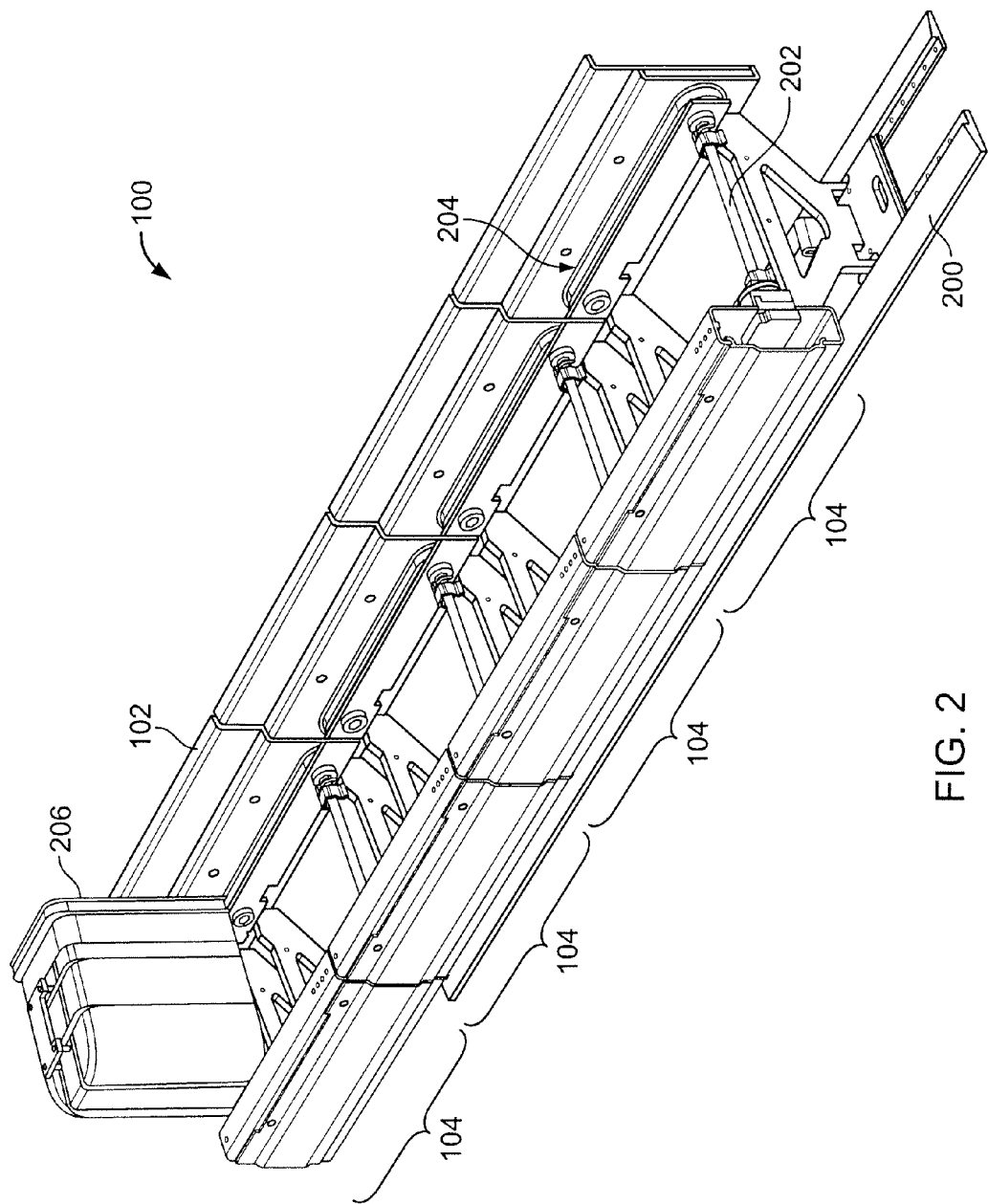
FIG. 2 is an exemplary view of a FOUP on a conveyor made up of multiple conveyor segments.

FIG. 2 is an exemplary view of the processing area 100 in accordance with one embodiment of the present invention. In this exemplary embodiment, four conveyor segments 104 make up the conveyor 102. A FOUP 206 is shown on the conveyor 102 along with some belt modules 204 within the conveyor segments 104. In one embodiment a drive motor provides movement to a belt module on one side of the conveyor segment and a constant velocity driveshaft 202 is used to transmit movement to the belt module on the other side of the conveyor segment. Also shown in FIG. 2 is support beam 200.

Figure 3A:
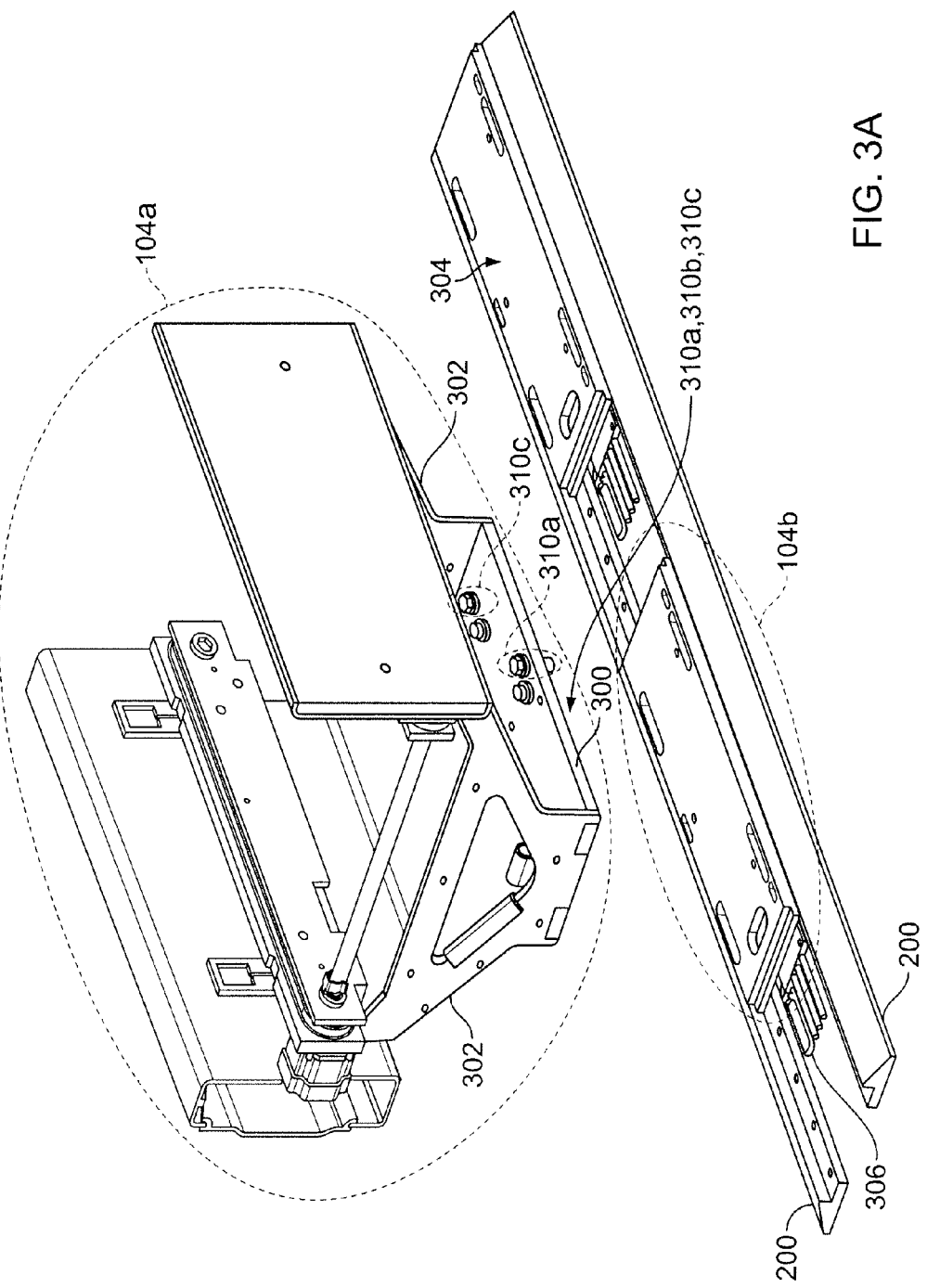

FIG. 3A-3C shows a conveyor segment 104 as a conveyor assembly 104a along with mounting assembly 104b and support beams 200, in accordance with an exemplary embodiment of the present invention. The support beams 200 define a channel that accommodates the mounting assembly 104b. The lower assembly 104b includes a modular Printed Circuit Board (PCB) 306 and a threshold center plate 304. The channel between the support beams 200 accommodates the modular PCB 306 while the threshold center plate 304 covers the modular PCB 306. The threshold center plate 304 also is used to mount the conveyor assembly 104a to the mounting assembly 104b.

The conveyor assembly 104a includes two space frames 302 spaced apart by a kinematic plate 300. In one embodiment, three kinematic pins 310a, 310b, and 310c pass through the kinematic plate and rest against defined geometry on threshold center plate 304. The kinematic pins 310a, 310b, and 310c are used to initially align the conveyor segment 104 via pitch (Y-axis) and roll (X-axis). In one embodiment, the defined geometry on the threshold center plate allows fine linear adjustments of the entire conveyor assembly 104a along the length of the X-axis. Once the kinematic pins 310a-310c have been aligned, the kinematic pins for the particular conveyor segment 104 can be locked into the aligned position. Thus, the conveyor assembly 104a can be removed and the locked kinematic pins can be used to precisely relocate the conveyor assembly 104a onto the threshold center plate 304 without required additional alignment.

Figure 3D:
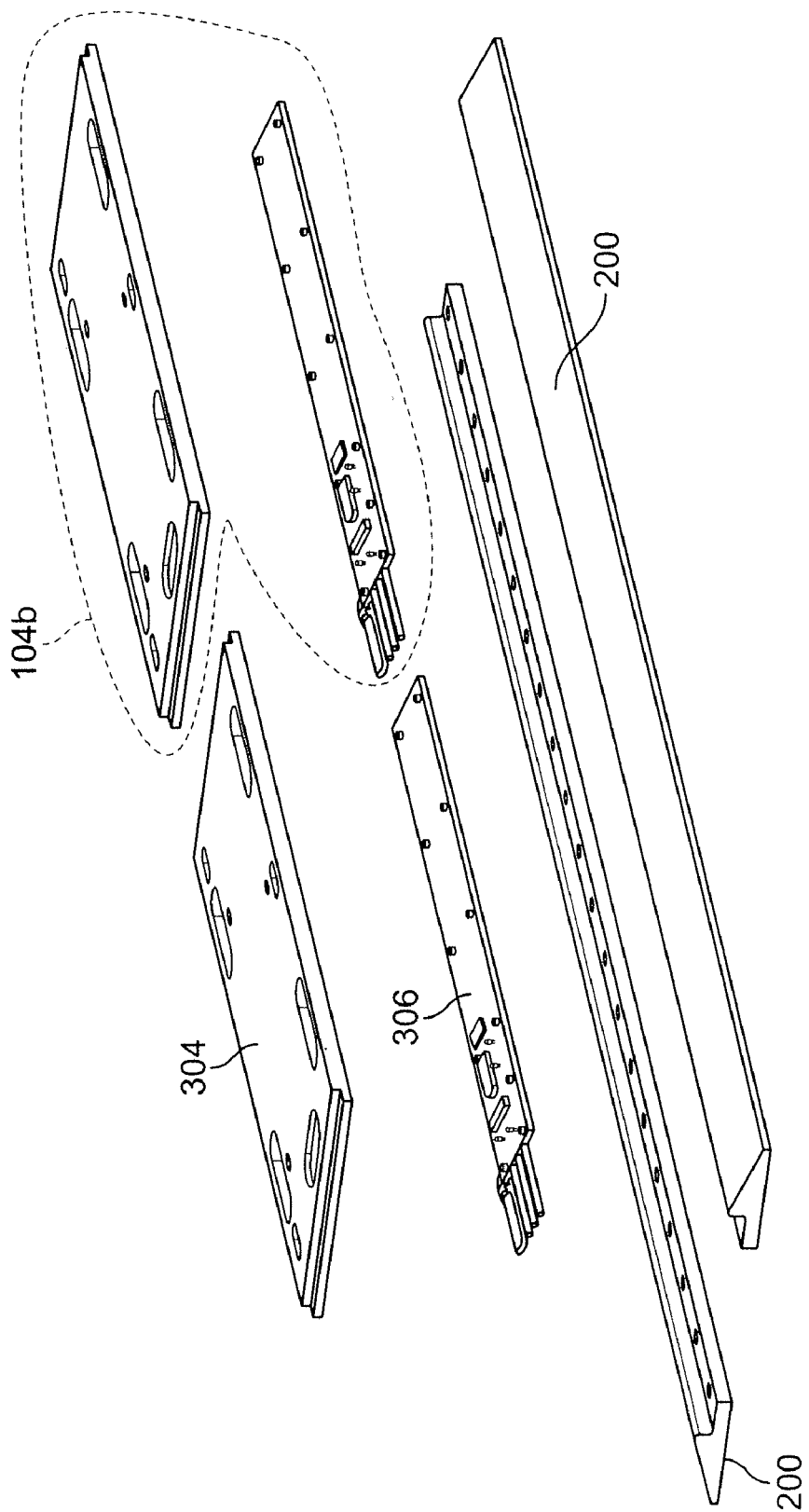
FIG. 3D is a view of the mounting assembly that may include a threshold center plate and a modular printed circuit board. The mounting assembly may be attached to the support beams.

FIG. 3D is an exemplary view of the lower assembly 104b along with the support beams 200 in accordance with one embodiment of the present invention. The modular PCB 306 provides power and communications to the conveyor assembly 104a and is enclosed by the support beams 200 and the threshold center plate 304.

Figure 4:
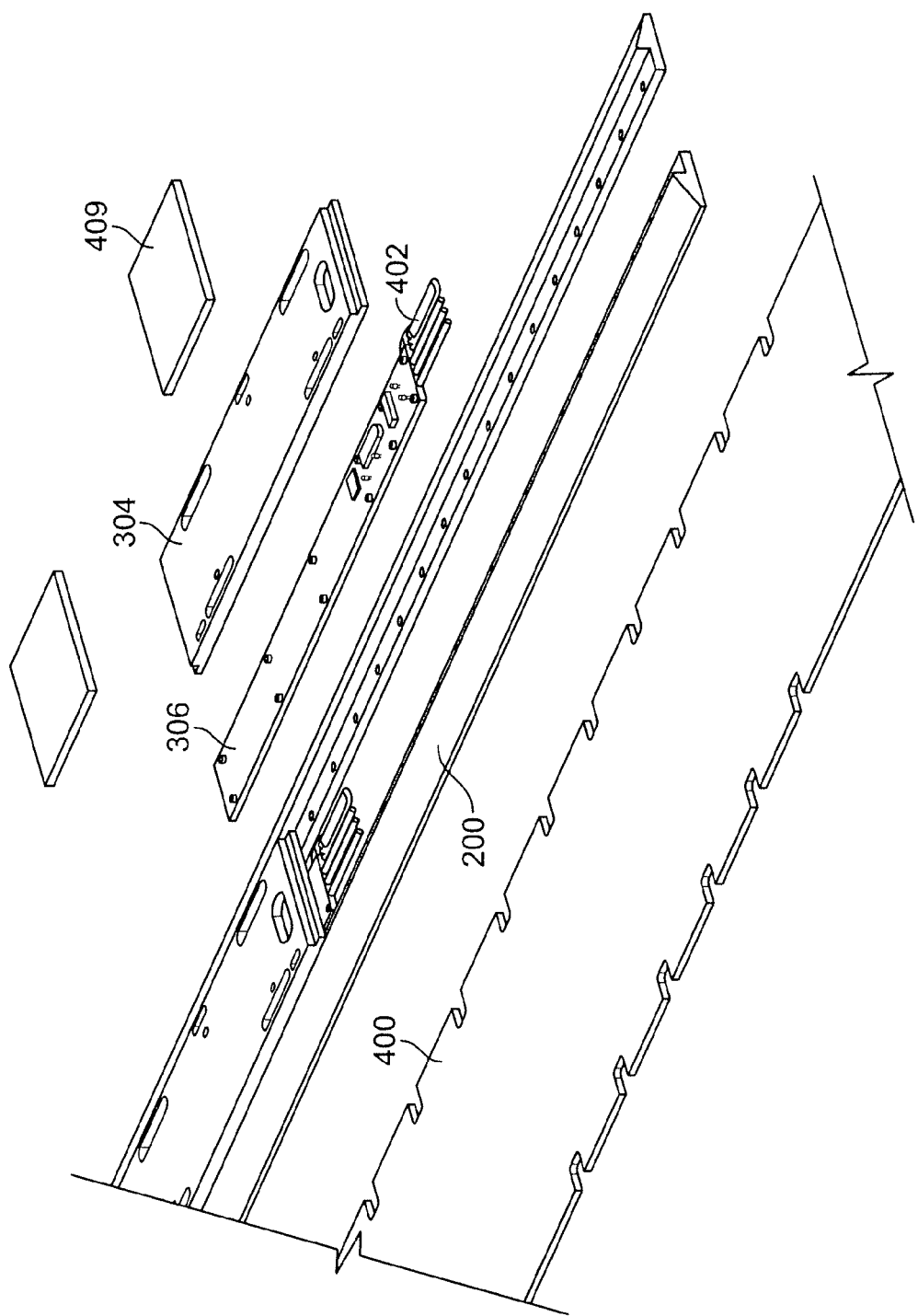
FIG. 4 illustrates an exploded view of the mounting assembly including a base plate and covers. Also illustrated are power and communication cables that can be used to transmit power and control signals between modular printed circuit boards.

FIG. 4 is an exemplary exploded view of the mounting assembly 104b along with covers 409 and base plate 400, in accordance with one embodiment of the present invention. In one embodiment, the base plate 400 can be secured to a floor and the support beams 200 can be affixed to the base plate 400. The modular PCB 306 can then be completely enclosed between the base plate 400, the support beams 300 and the threshold center plate 304. In this embodiment, the modular PCB 306 is shown with power and communication cables 402 and is attached to a bottom side of the threshold center plate 304. Covers 409 can be used to cover the power and communications cable 402 between the threshold center plates 304. A complete mounting assembly 104b is shown enclosed within the support beams 200.

Figure 5:
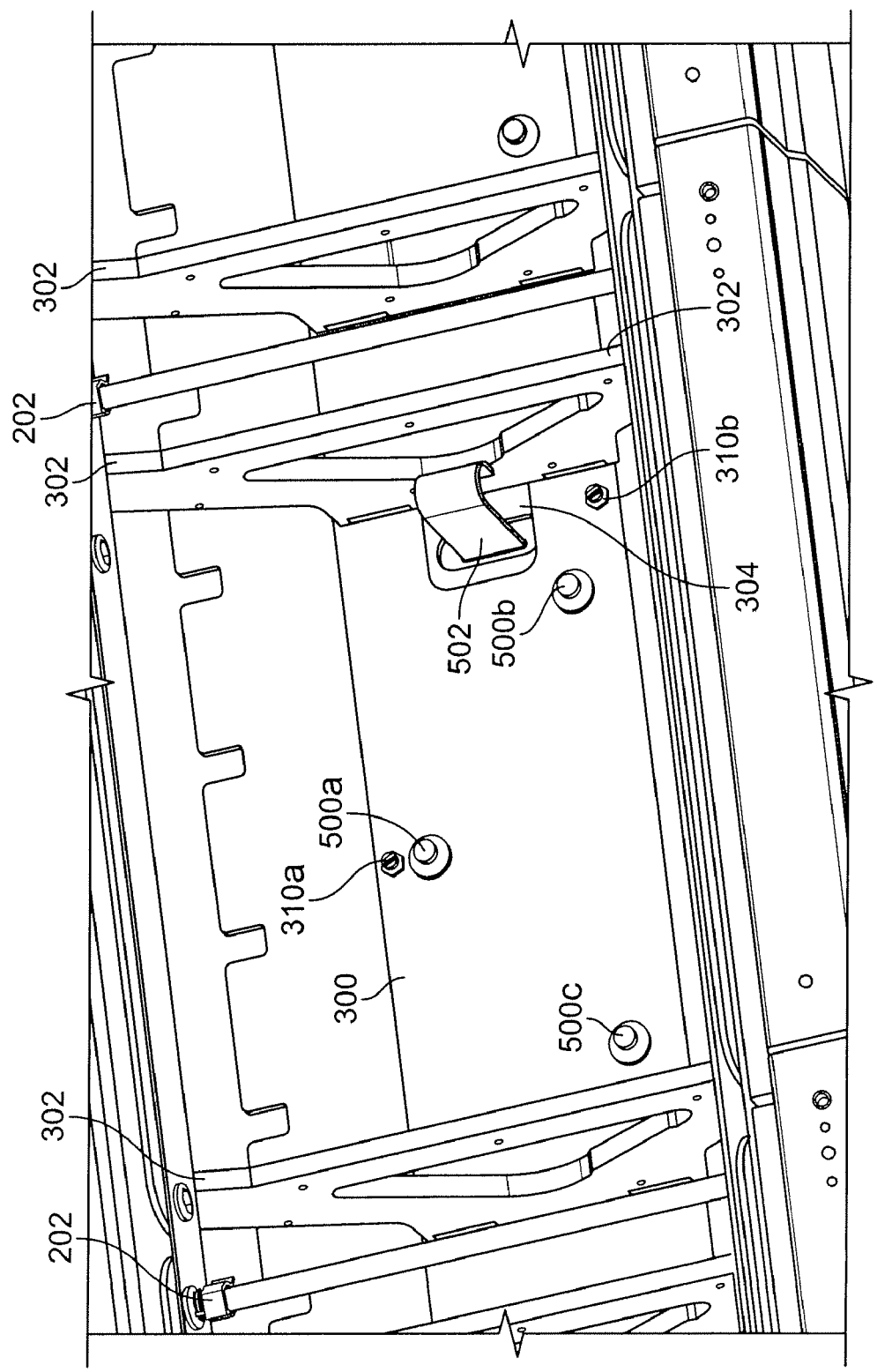
FIG. 5 is an exemplary illustration of a conveyor segment looking through the conveyor assembly. The kinematic plate is shown along with kinetic pins and fasteners. Also shown is a power and communications connector from the bus.

FIG. 5 is an exemplary view of the kinematic plate 300 through the top of the conveyor assembly 104a. This view shows the kinematic pins 310a-310c along with screws 500a-500c. As previously discussed, the kinematic pins are used to initially align the conveyor assembly 104a and then to repeatedly relocate the conveyor assembly 104a after removal. The fasteners 500a-500c are used to secure the conveyor assembly 104a to the threshold center plate 304. Thus, the fasteners 500a-500c pass through the kinematic plates and mate with features on the threshold center plate.

In one embodiment, the fasteners 500a-500c are removed and the entire conveyor assembly 104a can be removed for servicing. Once servicing is completed, the kinematic pins help relocate the conveyor assembly 104a on the threshold center plate and fasteners 500a-500c are used to secure the conveyor assembly 104a to the threshold center plate. Also shown in FIG. 5 is a bus 502 that provides all power and communications needs for the conveyor segment 104. Also shown are multiple space frames 302 and constant velocity drive shafts 202

Figure 6:
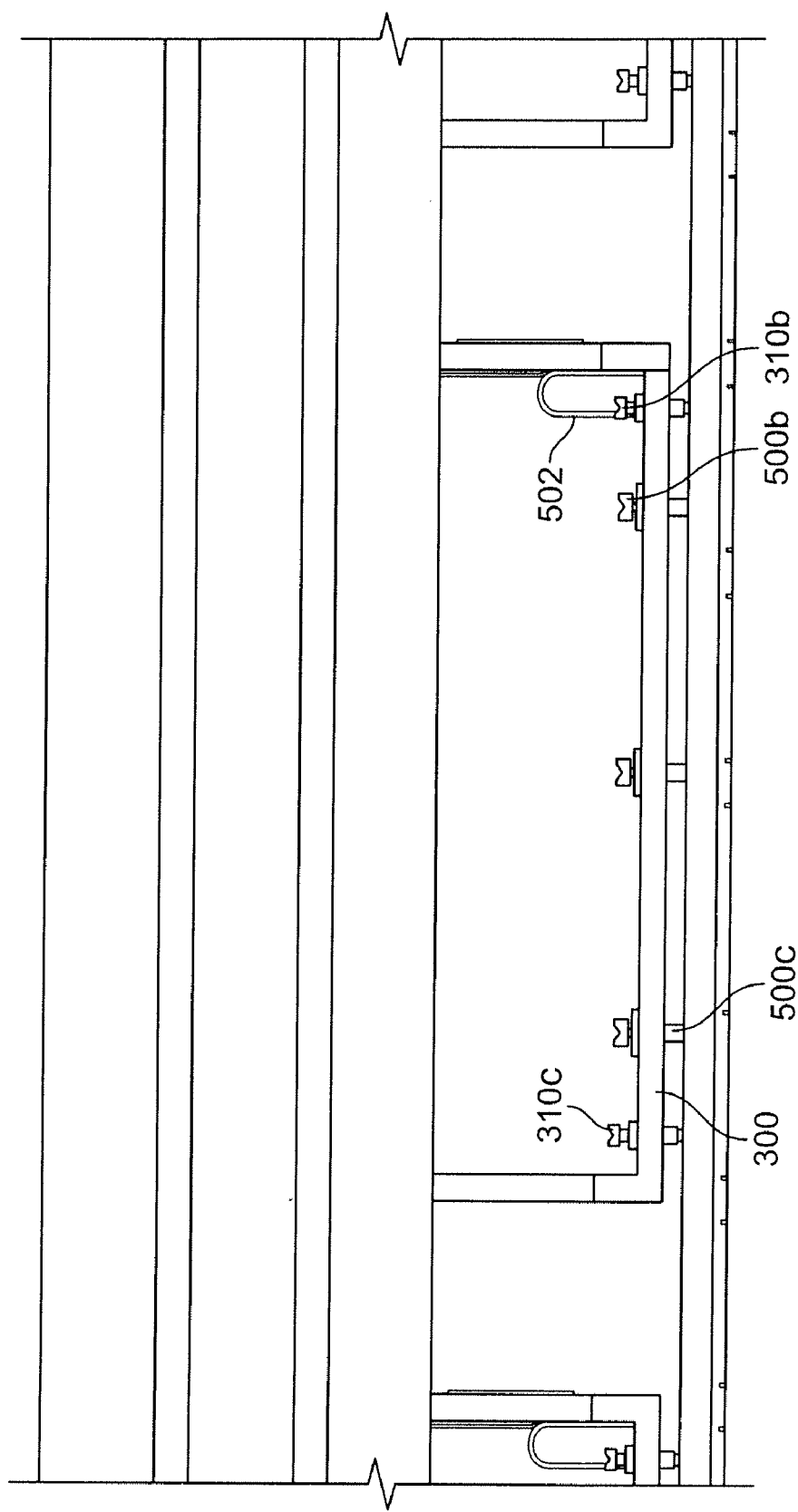
FIG. 6 is side view of a conveyor segment that illustrates the kinematic pins and fasteners used to locate and secure the conveyor assembly to the mounting assembly.

FIG. 6 illustrates a side view of a conveyor segment 104 in accordance with one embodiment of the present invention. Kinematic pins 310c and 310b can be seen along with fasteners 500c can be seen passing through the kinematic plate 300. Fastener 500a is also visible passing through the kinematic plate 300 and the kinematic pin 300a is partially visible behind the fastener 500a. The threshold center plate can be formed with features to accommodate the kinematic pins 310a-310c. Such features can include grooves, slots or holes. The features in the threshold center plate can assist in aligning and leveling the conveyor assembly 104a using the kinematic pins 310a-310c. In one embodiment, the kinematic pins can be locked into position using jam-nuts once the conveyor assembly 104a is properly leveled and aligned.

When the kinematic pins are locked into position, it does not mean that the conveyor assembly 104a is secured or locked into position. Rather, locking the kinematic pins into position results in the kinematic pins being able to relocate the conveyor assembly 104a back in the level and aligned position after being removed for service or maintenance.

The fasteners 500a-500c are used to secure the conveyor assembly 104a to the threshold center plate. The fasteners 500a-500c prevent the conveyor assembly 104a from being knocked over, jostled, or vibrated when a FOUP traverses the conveyor segment 104. Also shown in is the bus 502 that provides power and communications for the conveyor segment 104.

Figure 7:
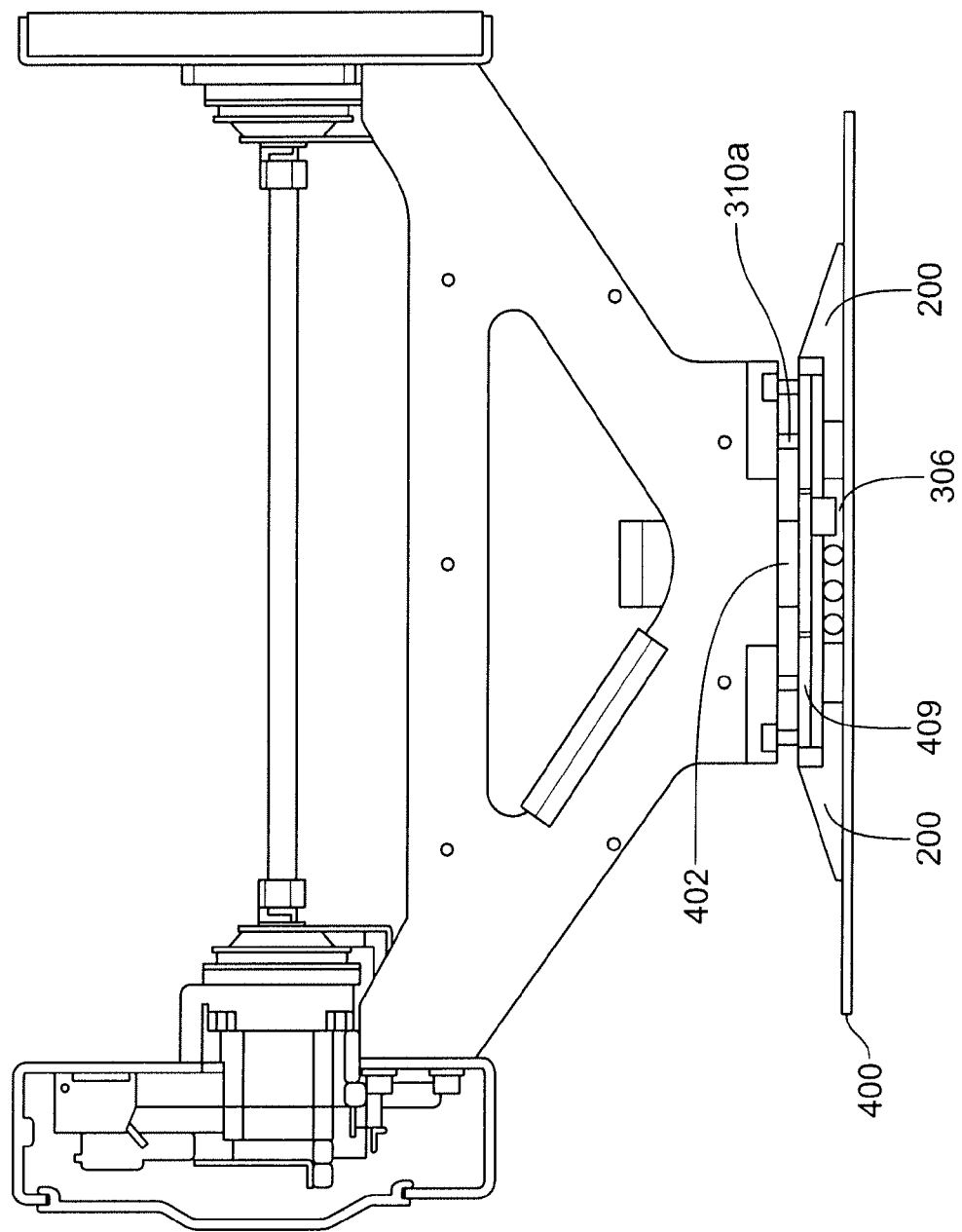
FIG. 7 is a front view of a conveyor segment, support beams, and base plate. This figure illustrates how the base plates, support beams and conveyor segment enclose the modular PCB.

FIG. 7 shows an end view of the conveyor segment 104 along with the support beams 200 and the base plate 400 in accordance with one embodiment of the present invention. This view shows how the modular PCB 306 is attached to the threshold center plate 304 and enclosed by the base plate 400, support beams 200 and cover 409.

Figure 8:
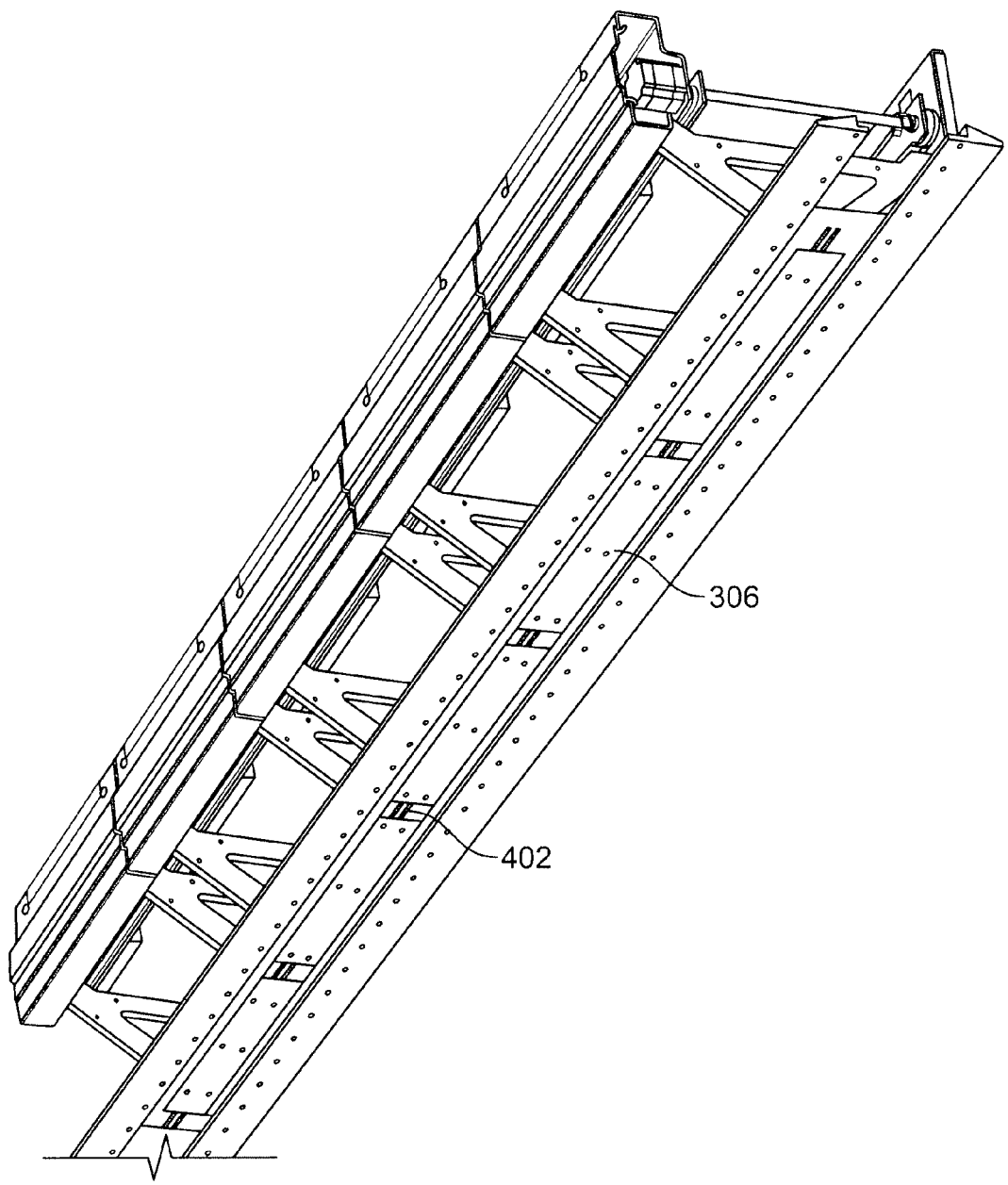
FIG. 8 is an exemplary bottom view of the conveyor without the base plate. This view illustrates how the bus can interconnect the modular PCBs of the conveyor segments. Also shown are the covers that prevent the bus from exposure between the conveyor segments.
Figure 9:
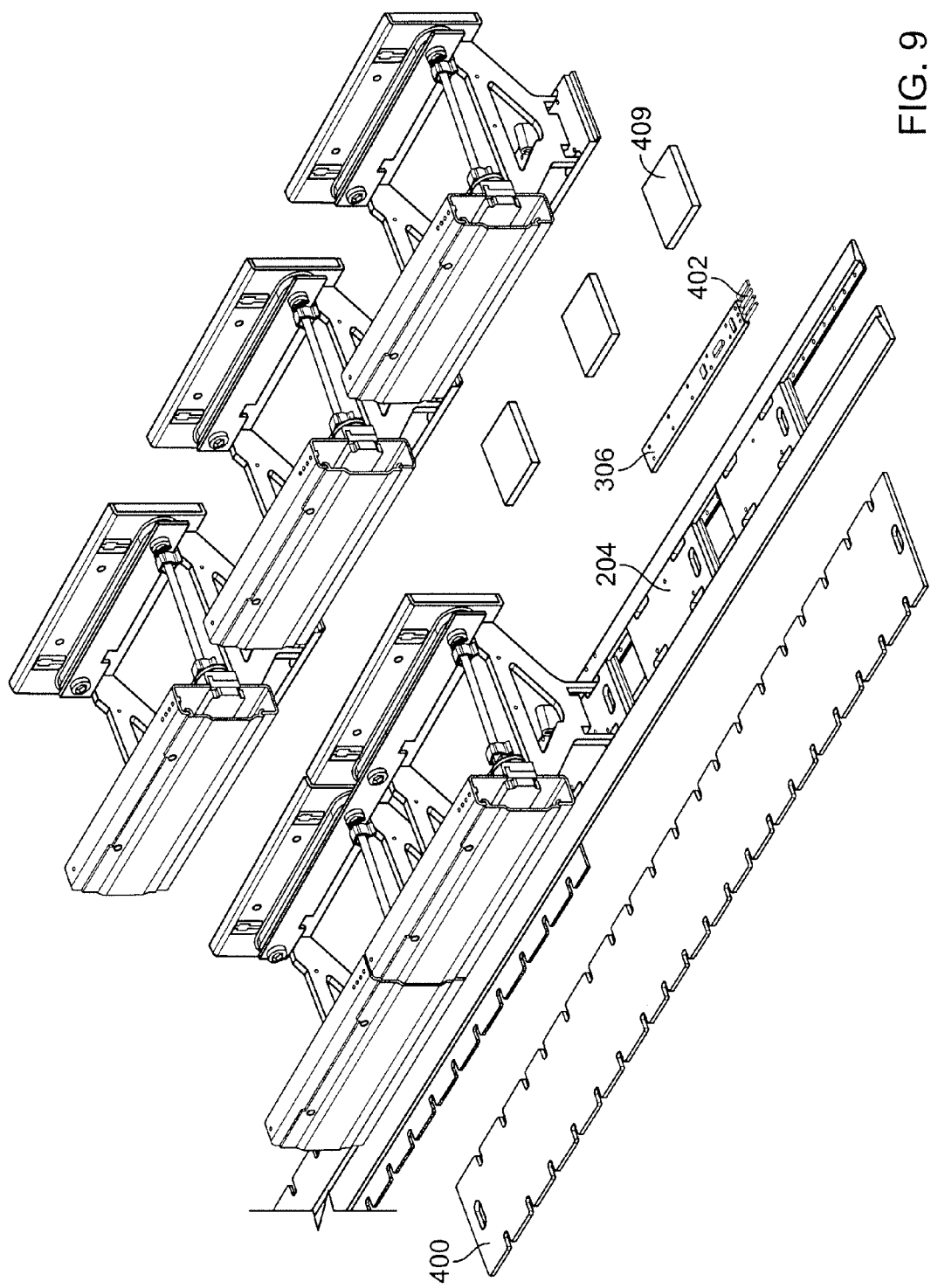
FIG. 9 is a partially exploded view of multiple conveyor segments and the mounting assembly. In this view the base plate, support beams, threshold center plate, modular PCB and covers are referred to as a threshold assembly.

FIGS. 8-10A are various views of multiple conveyor segments in accordance with embodiments of the present invention. FIG. 8 illustrates the location of the modular PCB 306 between the support beams 200 when the base plate is not shown. FIG. 8 also illustrates that the support beams 200 can be supplied in lengths different than those of the conveyor segments. In one embodiment, the power and communications cables 402 can allow power to be fed from both ends of the conveyor system to improve system functionality. For example, you can rapidly remove multiple portions of assembly 104a from the threshold assembly while retaining functionality throughout the remaining conveyor. In other embodiments, each modular PCB 306 is connected to its neighbor modular PCB using a ribbon cable for communications (either high speed serial or Ethernet) and larger gauge wires for power and ground.

In some embodiments, a dual supply bus/power supply is available so that in the event of a power failure from either a single line or a power supply, an alternate power line will supply power to the conveyor to maintain operation. Each conveyor assembly can be attached to ground via the kinematic pins touching the threshold center plate. Support beams that provide easy access by wheeled equipment support the threshold center plate. In one embodiment, the support beams are anchored to a base plate using double-sided tape. The installation of the support beams may require the use of an assembly fixture in order to provide accurate alignment and leveling. FIG. 10 illustrates that the conveyor module has a length X of 500 mm However, this is merely one embodiment and the length of the conveyor modules is not fixed. In other embodiments, a conveyor can be made from conveyor modules of different or similar lengths as determined by individual installation requirements.

Figure 10A:
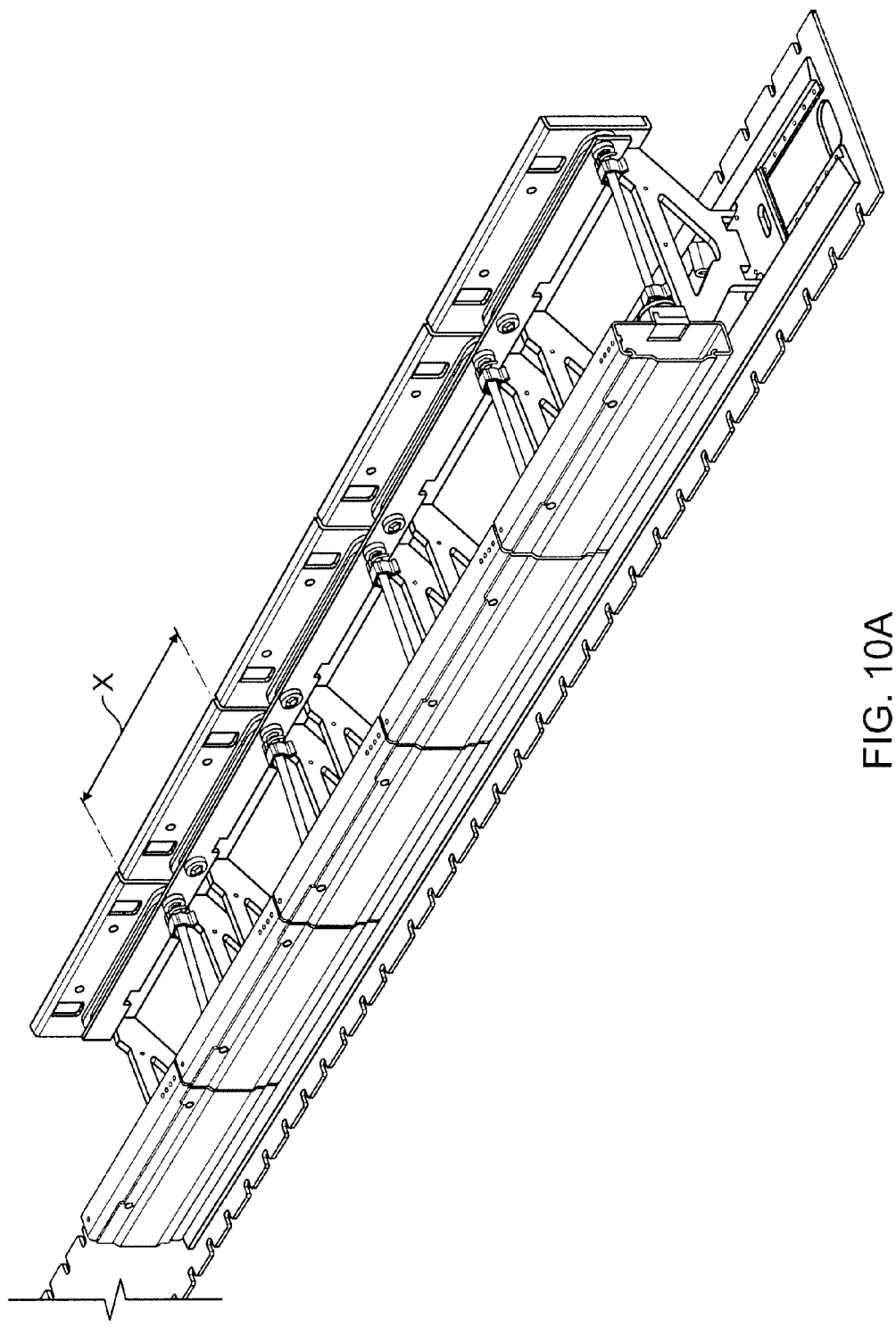
FIG. 10A is view of the conveyor and base plate.
Figure 10B:
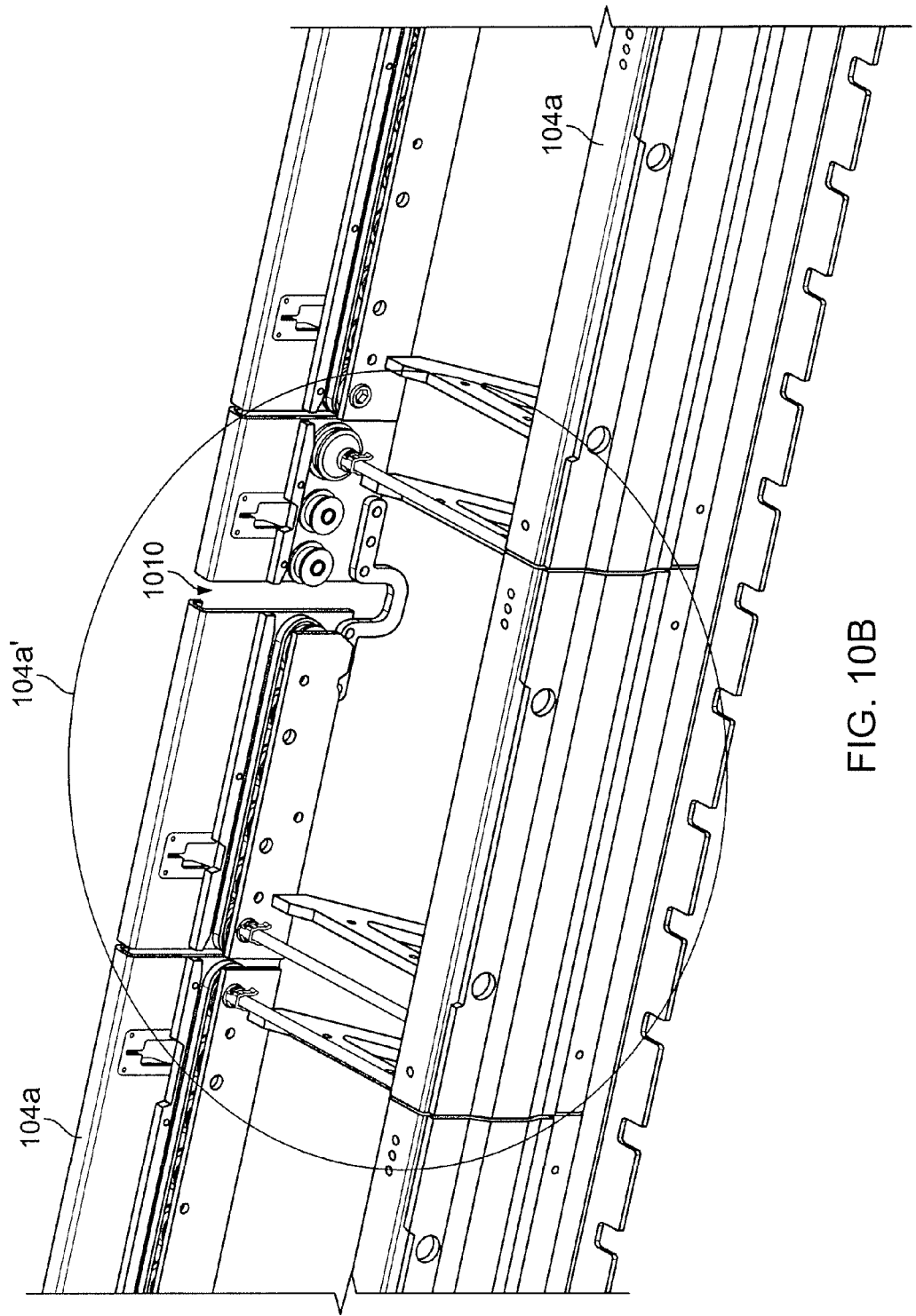
FIG. 10B is a view of a load port conveyor assembly 104a'. The load port conveyor assembly includes a feature or geometry that allows a load port to lift a FOUP off of the conveyor.

FIG. 10B illustrates an exemplary load port conveyor assembly 104a' adjacent to conveyor assemblies 104a, in accordance with one embodiment of the present invention. The load port conveyor assembly 104a' includes a cutout 1010 that allows load ports to pick-up and/or drop-off a FOUP traversing the conveyor. The geometry of cutout 1010 is intended to be exemplary and should not be considered limiting. A load port conveyor assembly 104a' can include other features or geometries that provide a load port access to a FOUP traveling along the conveyor.

Figure 11:
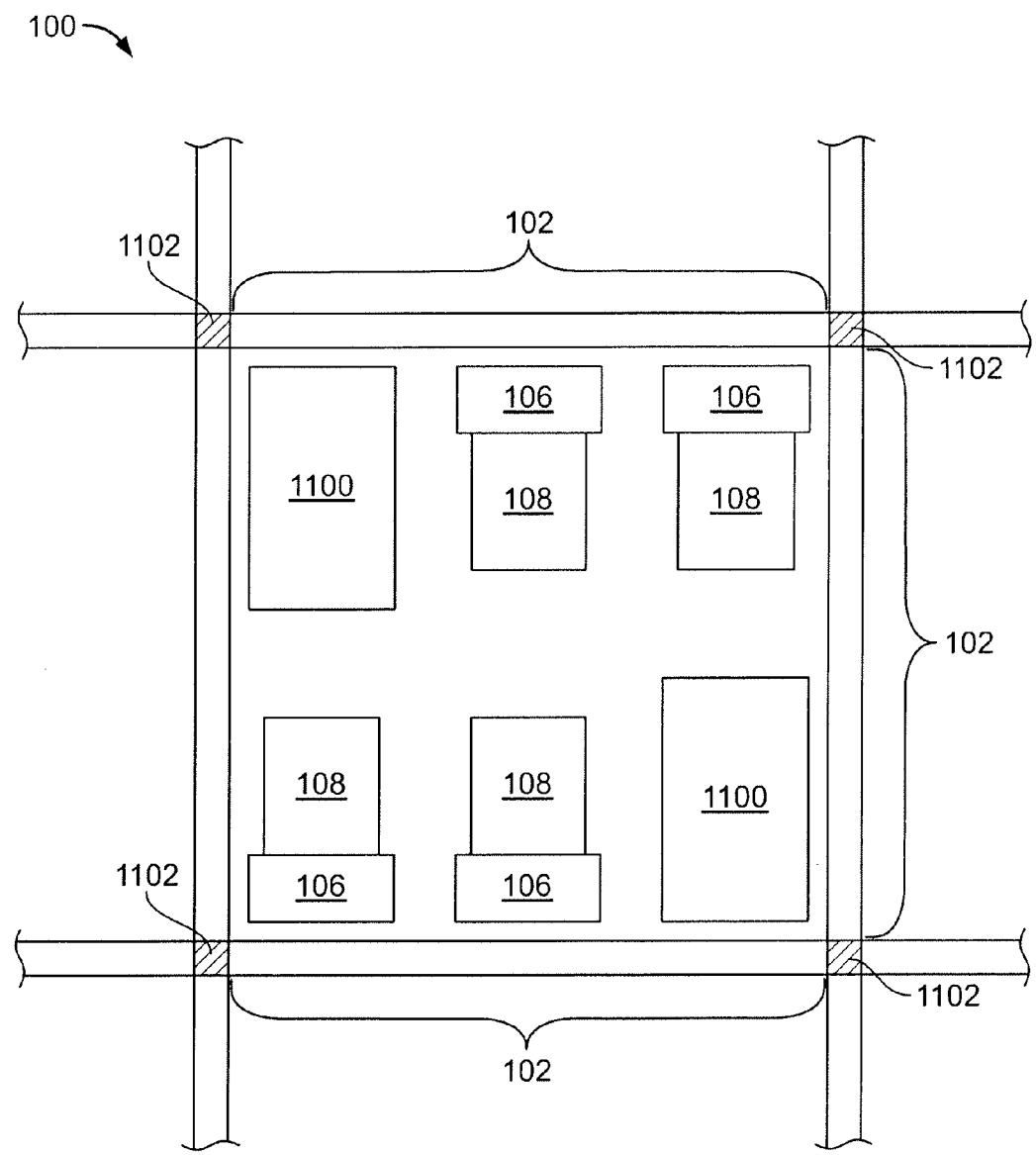
FIG. 11 is an exemplary view of a processing area that can use multiple conveyors having multiple conveyor segments. The conveyors can be used to transport FOUPs to and from various tools and stacker machines.

FIG. 11 is an exemplary overhead view of a portion of a process area 100 in accordance with one embodiment of the present invention. In this embodiment, conveyors 102 can form a grid to supply FOUPs to various tools 108 via load ports or stackers 1100. Where conveyors 102 intersect, a director 1102 can be used to rotate and direct FOUPs to a desired location. The configuration of conveyors 102, tools and directors 1102 shown in FIG. 11 is intended to be exemplary and is not intended to be considered comprehensive of process area 100 layouts.

As previously discussed, the conveyors 102 can include integrated networked communications. These communications allow individual conveyor segments to be controlled by a computer system via a network. The computer system can also execute software that allows individual FOUPs to be transported and tracked stopped at load ports, stackers, or while on the conveyors 102.

The invention may be practiced with other computer system configurations including, but not limited to, computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A conveyor system, comprising:
    a threshold assembly comprising:
        a base plate that is secured to a floor;
        support beams that are secured to the base plate, wherein an area between the support beams forms a channel;
        a plurality of threshold center plates for spanning and enclosing the channel formed by the support beams; and
        a printed circuit board that fits within the channel and is enclosed within the channel by at least one of the plurality of threshold center plates;
    a plurality of conveyor assemblies, wherein a conveyor assembly comprises a modular segment of a conveyor; and
    a plurality of kinematic pins for aligning at least one of the plurality of conveyor assemblies to the threshold assembly;
    wherein each of the plurality of kinematic pins is configured for movement to a locked position to mark a position in which a first conveyor assembly in the plurality of conveyor assemblies is aligned with the threshold assembly; and
    wherein the plurality of kinematic pins in the locked position promotes replacement of the first conveyor assembly with a second conveyor assembly, with the replacement being independent of re-alignment of the second conveyor assembly relative to the threshold assembly.

2. The conveyor system of claim 1, wherein each of the conveyor assemblies comprises one or more of one or more drive motors, one or more belts and one or more sensors.

3. The conveyor system of claim 1, further comprising:
    a kinematic plate to enable the first conveyor assembly to be aligned and leveled before being secured to the threshold assembly;
    wherein at least one of the plurality of kinematic pins is configured to pass through the kinematic plate to rest on one or more defined geometric patterns on a surface of at least one of the plurality of threshold center plates to align the first conveyor assembly with the threshold assembly.

4. The conveyor system of claim 3, wherein the kinematic plate is part of the first conveyor assembly.

5. The conveyor system of claim 1, wherein each of the plurality of conveyor assemblies comprises a modular assembly configured for removal from the conveyor while other conveyor assemblies remain in the conveyor.

6. The conveyor system of claim 1, further comprising:
    wherein the at least one of the plurality of threshold center plates is configured for mounting the first conveyor assembly to the threshold assembly.

7. The conveyor system of claim 1, wherein the first conveyor assembly comprises a same assembly as the second conveyor assembly.

8. The conveyor system of claim 1, further comprising:
    a computer configured to control the first conveyor assembly.

9. The conveyor system of claim 8, wherein the computer is further configured to perform one or more of activating and deactivating one or more drive motors in the first conveyor assembly.

10. The conveyor system of claim 8, wherein the computer comprises a first computer, and wherein the conveyor system further comprises:
    a bus system configured to:
        network the first computer with a second computer configured to control a third conveyor assembly in the plurality of conveyor assemblies; and
        provide power among the plurality of conveyor assemblies.

11. A method of replacing a conveyor assembly, comprising:
    aligning, by one or more kinematic pins, a first conveyor assembly to a threshold assembly, wherein the first conveyor assembly comprises a modular segment of a conveyor;
    following alignment of the first conveyor assembly to the threshold assembly:
        locking the one or more kinematic pins in a position of alignment in which the first conveyor assembly is aligned with the threshold assembly;
    removing the first conveyor assembly from the conveyor; and
    following removal of the first conveyor assembly:
        re-placing the first conveyor assembly with a second conveyor assembly in the conveyor; and
        using the one or more kinematic pins in the locked position to place the second conveyor assembly in the position of alignment relative to the threshold assembly;

wherein the one or more kinematic pins in the locked position of alignment promotes replacement of the first conveyor assembly with the second conveyor assembly, with the replacement being independent of re-alignment of the second conveyor assembly relative to the threshold assembly.

12. The method of claim 11, wherein the threshold assembly comprises a threshold center plate.

13. The method of claim 11, wherein aligning comprises performing one or more of:
   adjusting the first conveyor assembly along an X-axis of the threshold assembly;
   adjusting the first conveyor assembly along a Y-axis of the threshold assembly; and
   adjusting the first conveyor assembly along a Z-axis of the threshold assembly.

14. The method of claim 11, wherein the first conveyor assembly comprises a same conveyor assembly as the second conveyor assembly.

15. The method of claim 11, wherein the threshold assembly comprises a base plate that is secured to a floor; and
   wherein aligning comprises:
      aligning the first conveyor assembly to the threshold assembly irrespective of conditions of the floor.

16. The method of claim 15, wherein aligning comprises: leveling the first conveyor assembly relative to the floor.

17. The method of claim 11, wherein using the one or more kinematic pins in the locked position to place the second conveyor assembly in the position of alignment comprises:
   using the one or more kinematic pins in the locked position to place the second conveyor assembly in the position of alignment independent of additional alignment of the second conveyor assembly to the threshold assembly.

18. The method of claim 11, wherein the first conveyor assembly comprises a kinematic plate, and wherein the method further comprises:
   inserting the one or more kinematic pins into one or more openings in the kinematic plate; and
   wherein aligning comprises:
      aligning by the one or more kinematic pins inserted into the one or more openings of the kinematic plate.

19. The method of claim 11, wherein following removal of the first conveyor assembly and prior to placement of the second conveyor assembly, the method further comprises:
   moving one or more containers along one or more third conveyor assemblies of the conveyor.

20. The method of claim 11, wherein following removal of the first conveyor assembly and prior to placement of the second conveyor assembly, functionality is maintained in other conveyor assemblies of the conveyor.

* * * * *

UNITED STATES PATENT AND TRADEMARK OFFICE
CERTIFICATE OF CORRECTION

PATENT NO. : 8,096,408 B2  
APPLICATION NO. : 12/420053  
DATED : January 17, 2012  
INVENTOR(S) : Roumen Iliev Deyanov and Joseph John Fatula, III It is certified that error appears in the above-identified patent and that said Letters Patent is hereby corrected as shown below:

On the cover page of the issued Patent, Paragraph No. (54), (Title), please delete "ASSEMBLY" and insert --ASSEMBLY,--, therefor.

At Column 1, Line 2, please delete "ASSEMBLY" and insert --ASSEMBLY,--, therefor.

Signed and Sealed this
Tenth Day of April, 2012

David J. Kappos
*Director of the United States Patent and Trademark Office*